United States Patent Office 3,207,819
Patented Sept. 21, 1965

3,207,819
METHOD OF MAKING FIBREBOARD
Harry A. Raddin and S. Hunter W. Brooks, Richmond, Va., assignors to Miller Hofft, Inc., Richmond, Va., a corporation of Delaware
No Drawing. Filed July 13, 1961, Ser. No. 123,638
6 Claims. (Cl. 264—26)

It is an object of this invention to provide a method of making thick, medium to high density fibreboard.

It is a further object of this invention to provide a method as aforesaid using high frequency dielectric heating in conjunction with direct superficial heating to accelerate the curing process.

It is a further object of this invention to provide a method as aforesaid in which the binder is almost wholly activated subsequent to mixing with the fibrous material of the board.

It is a further object of this invention to provide an improved thick fibreboard of medium to high density.

The above and other objects will be made clear from the following detailed description.

The advantages of this invention are realized to the greatest possible extent when the basic board material is fibre and the binder is a high solids content solution, suspension or colloid of resin forming material.

For the purpose of this invention, any resin or resin mixture which performs physically as called for hereinafter may be used. In practice, for reasons of cost, however, urea formaldehyde and melamine formaldehyde resins, or mixtures of these are used, and while not excluding other resins which are or could be used, the present discussion will be confined to those named.

In practice heretofore, urea or melamine or both are partially reacted with formaldehyde to produce what will be referred to herein as a polymeric form. The latter, with a suitable catalyst, is mixed with particles, and, under heat, is further polymerized and condensed to rigid form, thus acting as a binder. The polymeric forms, however, while of high solids content, are of high viscosity and present severe mechanical mixing problems, especially when the particle size becomes attenuated as in fibreboard. Moreover, the initial reacting to polymeric form must be separately carried out under controlled conditions with resultant higher cost for the binder.

The fibre with which the present invention is concerned may be of any sort, including steamed and mechanically and/or chemically reduced cellulosic or lignocellulosic material such as wood, bagasse, straw, bamboo, sisal, cotton and, of course, such mineral fibres as asbestos. In short, any truly *fibrous* material in which the fibres have width and thickness approximately equal and far smaller in extent than the length will serve. Such fibres are flexible, and, depending to some extent on how they are produced may be springy or curly. A preferred form is produced by steaming reduced wood to soften the wood, the softened wood being than mechanically reduced by any of several conventional attrition mills, sometimes while still under steam pressure. The resultant fibre mass is then dried as desired, mixed with binder, pressed and cured.

Amino resins from their inception some twenty-five years ago, have undergone immense empirical development, but this empirical development has been unaccompanied by anything approximating equivalent theoretical development. The result is that even today results are not accurately predictable by means of theoretical considerations, and except so far as mere reproduction of previously produced reactions and results are concerned purely empirical considerations fail accurately to predict results. It is known that increasing acidity speeds the polymerization reaction. Increased temperature also speeds reaction. The reaction is mildly exothermic, and water is formed in the course of the reaction. These points are pretty well settled. The reaction is "triggered" by the attainment of a particular combination of temperature and acidity, and, once started, proceeds at a rate determined by such combination of temperature and acidity.

An unreacted solution of urea or melamine with formaldehyde may have a high solids content at a low viscosity. After reaction, the solids content decreases primarily because of the formation of water during the reaction. As used herein, therefore, the term "resin solids" refers to the true solids remaining after reaction, and not to the apparent solids content of the unreacted solution. For example, a solution having an unreacted, apparent solids content of 78% will react in the board to produce a resin solids content of 65%. It is the latter type of figure which will be used herein.

Obviously, as particle size decreases, the ratio of superficial area to volume increases. This ratio is enormously greater for truly fibrous material such as here contemplated than for particle board. When low viscosity, unreacted solutions are used in particle board formulations, there is considerable penetration of the particles, with a substantial proportion of the resin lying beneath the surface. This resin contributes little or nothing to the ultimate properties of the board, and therefore, is "wasted." In the fibre, however, the ratio of surface to volume is so great that most of the solution acts at the surface and contributes directly to stiffening and strengthening the final board.

This invention comprises mixing a low viscosity, high resin solids content solution of the largely unreacted components of amino resins, in the presence of acidic catalysts and possibly suitable buffering agents with a fibre furnished; forming the mixture of resin and fibre into a mat; precompressing the mat to acceptable thickness (a thickness which will enter between realistically spaced platens of a press); compression between heated platens to predetermined ultimate thickness; the application of a high frequency field between the platens to heat the board internally to a point at which the unreacted components of the amino type resins react to condense and polymerize; and maintaining the field until the reaction is completed sufficiently to adhere the fibres together. The platens are heated to a temperature which prohibits the condensation of water driven to the surface of the board during the electric heating phase, and permits the springing off of such moisture as steam upon relief of the platen pressure. Since such moisture is held as steam, or at least as saturated liquid at or about the interface between the platens and the board surface, the springing off of steam upon relief of platen pressure does not disrupt either the surface or the internal structure of the board.

Experiments have shown that, given proper equipment, densities of $60\#-70\#/ft.^3$ can be reached even at thicknesses of 3" or more. The following table represents experience to date, and not the ultimate limitations of the process.

| Thickness | Density |
|---|---|
| ½″ to ⅝″ | Up to 60#/ft.³ |
| ⅝″ to 1″ | Up to 50#/ft.³ |
| 1″ to 1½″ | Up to 40#/ft.³ |
| 1½″ to 3″ | Up to 30#/ft.³ |

The above limitations are those of equipment design *only*. It is entirely feasible to make board 3″ thick at a density of 60#/ft.³ by using a proper press size and pressure.

A typical formulation by weight of an unreacted ureaformaldehyde solution is as follows:

*Formulation No. I*

| | Parts |
|---|---|
| Urea | 100 |
| Formaldehyde | 78 |
| Water | 51 |
| Catalyst | 4.5 |

The viscosity of such solutions is about 25 cps and while the solids content appears to be 77%, the actual resin solids content contributed to the board is only 65%, due mostly to the production of water during the reaction as above noted. The resin treatment of the fibre, based on 65% resin solids content of the solution may be from 4% to 25% of the ultimate board, based on the oven dry (OD) weight of the fibre. It may be noted that a conventional, prereacted solution of urea formaldehyde would have a viscosity of about 200 cps, hence would be far too viscous to mix readily with fibre of the type here contemplated.

A typical formulation by weight of an unreacted urea-melamine-formaldehyde solution is as follows:

*Formulation No. II*

| | Parts |
|---|---|
| Urea | 67.5 |
| Melamine | 46.5 |
| Formaldehyde | 78.0 |
| Water | 58.0 |
| Catalyst | 2.0 |

The above formulation represents an improvement performancewise in the final product over that of the preceding, all urea formulation. The improvement is obtained, however, at some extra cost but is well worth while for many purposes. It involves a substitution of melamine for part of the urea, the substitution being based on amino groups.

This invention further comprises high frequency heating of the board at a frequency of from about three to about fifteen megacycles. The unit upon which the present process was developed has a rated output of 15 kw. between the press platens, which are 39″ x 42″ in dimensions. The platens are maintained at about 300° F. It has been found that if the platens are maintained at room temperature, and the mat heated by high frequency, water migrates to the platens and condenses on the platen surfaces leaving the finished board wet and weak at the surfaces. The fibre mass between the platens has a conductivity of about 0.03 B.t.u./hour/square foot/° F./foot of thickness and in total heating time of about 110 to about 420 seconds it is clear that the platens cannot deliver much heat into the board. Where the platens are believed to make a real contribution, however, is in supplying heat of vaporization to the liquid driven to the surface of the board by the high frequency internal heating. The specific heat of the fibre is only 0.4 B.t.u./#/° F., while the heat of vaporization of water is 970 B.t.u./#. Even a small proportion of water, therefore, represents a considerable heat demand if condensation at the surface is to be avoided.

With a 15 kw. unit, about 60 seconds will be required to bring the board to 212° F. The rest of the time and power is used to react the chemicals and evaporate the moisture both actual and formed by reaction. The reaction time appears to be an independent variable, through there is some evidence that the high frequency field acts to accelerate the reaction. The rate of reaction, as noted heretofore, is affected by catalysts and temperature.

The mat thickness of a 1½″ board at formation will be about 36″ and this will be reduced by precompression to about 8″. This presents a real problem in mat formation. It has been found, however, that if two 18″ mats are formed, and precompressed to 4″ of thickness, they may be superimposed and reduced to 1½″ between the platens of the high frequency press. After curing, the board is of uniform density and is free of interface weakness. The platens are subjected to whatever pressure is needed to establish the desired caliper. The density is determined by the initial mat weight. The actual pressure between adjacent fibres is neither known nor determinable.

The use of additives such as size, fungicides, insecticides, drying oils, etc., is conventional. These preferably are added during the mixing of the fibre with the resinous binders.

In the following table each column represents a specific example. In each example the start material is the same, namely wood fibre of the sort previously discussed. In colum 1, conventional, partially reacted urea-formaldehyde was used as a binder. In column 2, an essentially unreacted urea-formaldehyde solution, made in accordance with Formulation No. I, was used as a binder. In column 3 a conventional phenol-formaldehyde formulation, partially reacted, was used. This column is presented to provide a comparison with columns 2 and 4.

In column 4 the binder was an essentially unreacted solution of urea-melamine-formaldehyde in accordance with Formulation No. II.

In each case heating was by means of a high frequency field using a substantially constant frequency of six megacycles with only such minor variations as were necessary to maintain substantially constant power input to the boards.

| Board Type | 1 | 2 | 3 | 4 |
|---|---|---|---|---|
| Type Fibre | Wood | Wood | Wood | Wood |
| Board Density, #/cu. ft. OD | 43.7 | 43.4 | 43.6 | 43.0 |
| Board Thickness, in | .714 | .760 | .685 | .644 |
| Type Resin | (¹) | (²) | (³) | (⁴) |
| Solids in Resin | 58 | 65 | 40 | 60 |
| Viscosity of Resin, cps | 200 | 25 | 100 | 50 |
| Percent Resin Treatment | 10 | 10 | 11.6 | 10 |
| Percent Wax Treatment | None | 1.0 | 1.0 | 1.0 |
| Press Platen Temp., ° F. | 300 | 300 | 300 | 300 |
| HF Heating Time | 220 | 110 | 420 | 110 |
| Modulus of Rupture, p.s.i. | 1,940 | 3,590 | 3,560 | 3,714 |
| Modulus of Elasticity, x1,000 p.s.i. | 202 | 328 | 398 | 271 |
| Internal Bond, p.s.i. | 50 | 123 | 68 | 117 |
| Screw Holding, lbs | 237 | 387 | 197 | 297 |
| After 24 Hr. Immersion in Water: | | | | |
| Percent Thickness Swell | | 4.1 | 5.6 | 3.8 |
| Percent Water Absorption | | 18 | 26 | 11 |
| After 4 Hr. Boil in Water, then dry: | | | | |
| Percent Thickness Swell | (⁵) | (⁵) | 10.0 | 14.0 |

¹ Urea-Form.
² Formul. No. I.
³ Phenol-Form.
⁴ Formul. No. II.
⁵ Disintegrates.

The foregoing table shows, in columns 1 and 2 that the combination of essentially unreacted ingredients of a urea-formaldehyde thermosetting resin with high frequency heating produces results superior to the same ingredients, partially reacted as in conventional, and subjected to the same heating.

The table also shows, in columns 3 and 4 that the combination of essential unreacted urea-melamine-formaldehyde ingredients with high frequency heating produces results generally superior to an equivalent, conventional phenol-formaldehyde formation similarly heated.

A comparison of columns 2 and 3 shows that Formulation No. I produces results which compare favorably (except for the boiling test) with those produced by the conventional phenol-formaldehyde of column 3.

It was considered unnecessary to make similar comparisons with and between boards heated by conventional platens, since at the thicknesses and densities involved, the press time would be so great as to render production by such means commercially impracticable.

It is clear that the board per se is unique, since with the same proportion of the same binder and the same base material, the board of this invention has definitely superior qualities.

It is equally clear that within the scope of this invention there may be considerable variation in the selection of base fibre and in the formulation of the binder. There are two essentials: (1) the base must be fibrous, that is, the fibres must have their width and thickness approximately equal and far smaller in extent than their length; and (2) the binder must be a low viscosity (under about 100 cps.) solution of essentially unreacted ingredients of at least one thermosetting resin, with a high (at least about 60%) conent of resin solids. As used herein, the term "solution" includes suspensions, colloids, or mixtures of solutions, suspensions and/or colloids. This invention, therefore, is not to be restricted to the specific examples given but only as set forth in the subjoined claims.

What is claimed is:

1. A method of producing fibreboard comprising mixing a mass of lignocellulosic material which has been steamed and mechanically reduced to fibres with a solution of the essentially unreacted ingredients of a thermosetting resin; compressing the resulting mass to desired thickness between separately heated platens maintained at a temperature above 200° F., creating between said platens and throughout said mass a high frequency electric field; and maintaining said field for a time sufficient to initiate and at least partially complete the reaction of said ingredients; said solution of essentially unreacted ingredients of thermosetting resin having a viscosity under about 100 c.p.s. and a resin solids content of at least about 60%.

2. A method according to claim 1 in which the frequency of the field is from about three to about fifteen megacycles.

3. A method according to claim 1 in which the unreacted ingredients of the thermosetting resin are urea and formaldehyde.

4. A method according to claim 3 in which the frequency of the field is from about three to about fifteen megacycles.

5. A method according to claim 1 in which the unreacted ingredients of the thermosetting resin are urea, melamine and formaldehyde.

6. A method according to claim 5 in which the frequency of the field is from about three to about fifteen megacycles.

References Cited by the Examiner

UNITED STATES PATENTS

| 2,388,824 | 11/45 | Brown. | |
| 2,476,283 | 7/49 | Castellan | 264—26 |
| 2,697,254 | 12/54 | Gordon | 264—26 |
| 2,706,165 | 4/55 | Korsgaard | 156—380 |
| 2,717,420 | 9/55 | Roy | 18—47 |
| 3,002,878 | 10/61 | Linzell | 156—273 |
| 3,021,244 | 2/62 | Meiler | 154—45.9 |

FOREIGN PATENTS

| 1,114,384 | 12/55 | France. |
| 761,228 | 11/56 | Great Britain. |

OTHER REFERENCES

Fiberboard and Particle Board, report of an International Consultation on Insulation Board, Hardboard and Particle Board, sponsored jointly by the Food and Agriculture Organization of the United Nations and the Economic Commission for Europe, published by F.A.O. 1958, pages 53, 54, 65 and 49–77.

Herdey, Otto: Synthetic Resin and Other Additives Used in the Manufacture of Particle Boards, F.A.O./E.C.E./Board Cons./Paper 4.18, 1958, 19 pages.

Neumann et al.: Welding of Plastic, 1959, N.Y., Reinhold, pages 124 and 125.

ALFRED L. LEAVITT, *Primary Examiner.*

EARL M. BERGERT, DOUGLAS J. DRUMMOND, ALEXANDER H. BRODMERKEL, *Examiners.*